UNITED STATES PATENT OFFICE.

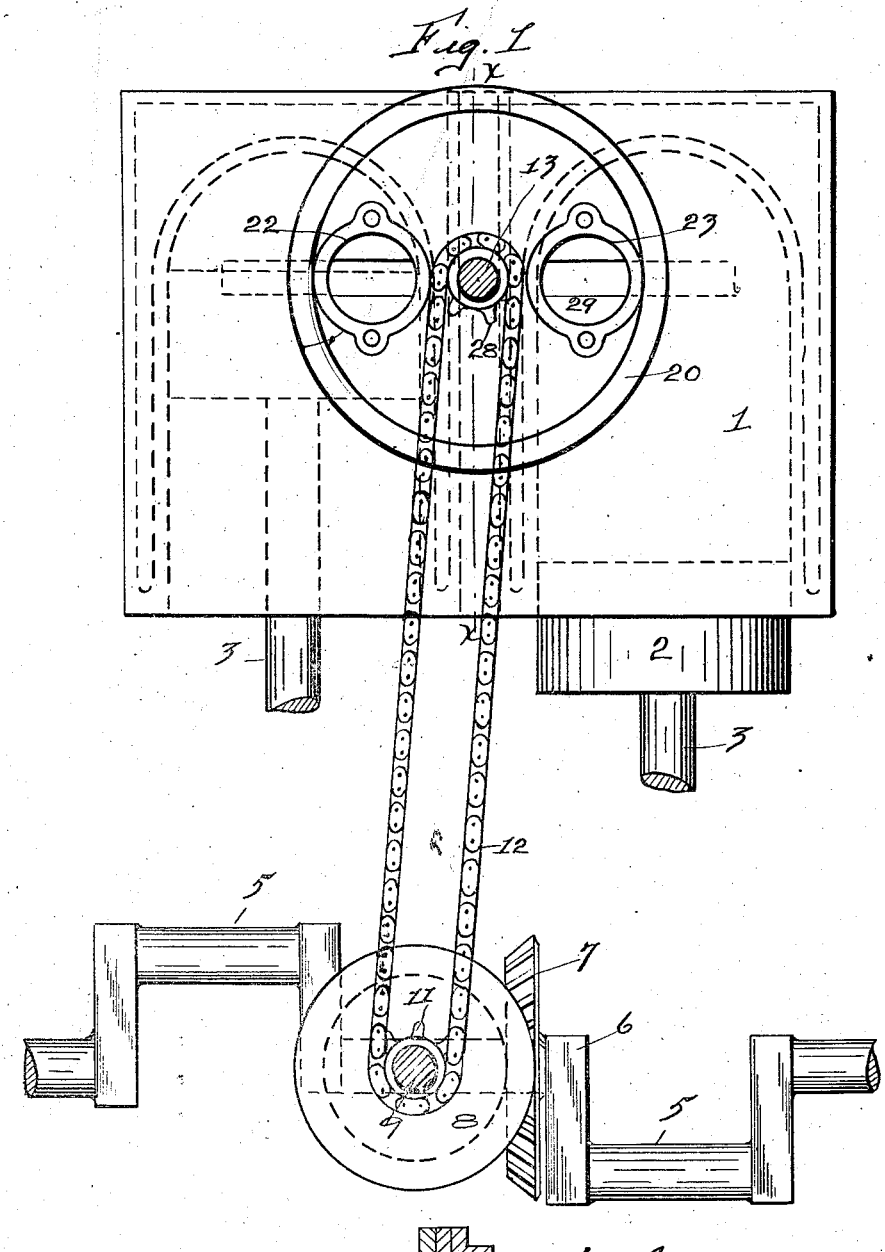

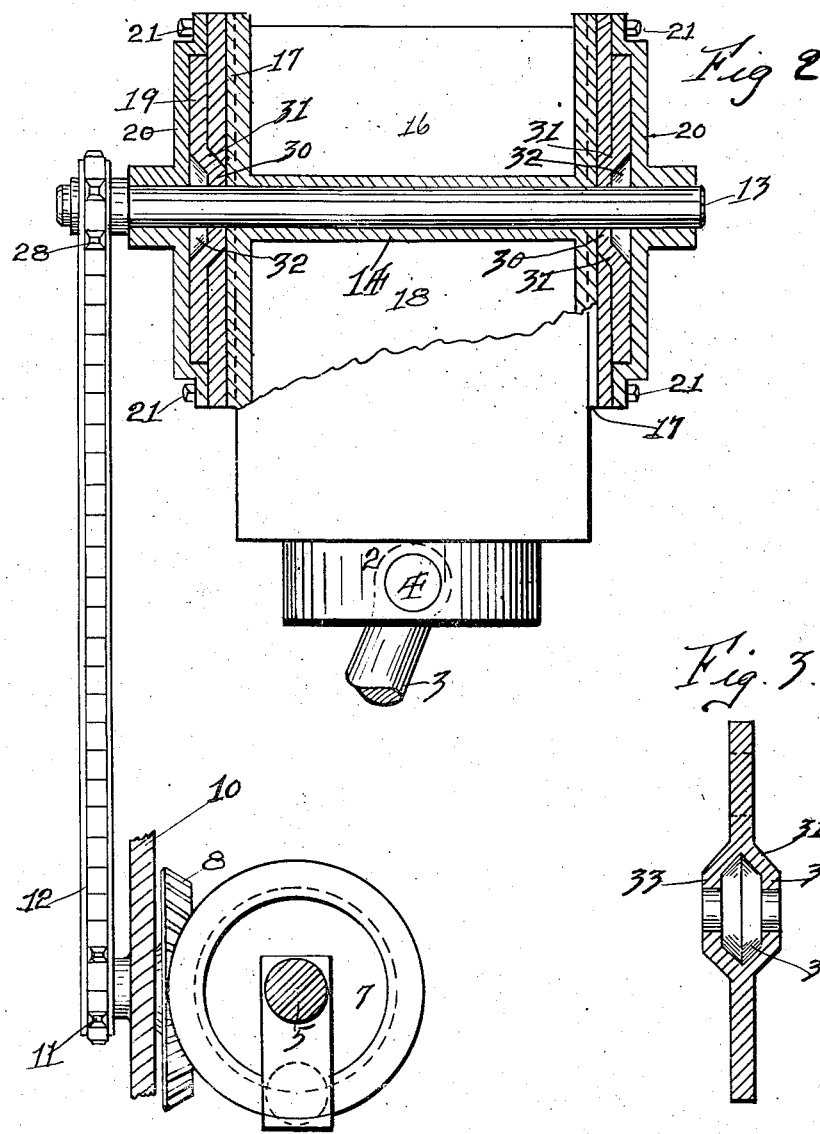

RICHARD SCHMITZ, OF CHICAGO, ILLINOIS, ASSIGNOR TO SCHMITZ ENGINE COMPANY, A CORPORATION OF SOUTH DAKOTA.

VALVE FOR GAS-ENGINES.

1,183,775.  Specification of Letters Patent.  Patented May 16, 1916.

Original application filed March 6, 1911, Serial No. 612,512. Divided and this application filed May 11, 1912. Serial No. 696,609.

*To all whom it may concern:*

Be it known that I, RICHARD SCHMITZ, a citizen of the United States, residing in Chicago, county of Cook, and State of Illinois, have invented a certain new and useful Improvement in Valves for Gas-Engines, of which the following is a specification.

My invention relates to that form of device which is described in my co-pending application, Serial No. 612,512, of which this application is a division and has for its object to provide an improved form of valve.

My means of accomplishing the foregoing may be more readily understood by having reference to the accompanying drawings, which are hereunto annexed and are a part of this specification, in which:

Figure 1 is a side elevation of an engine utilizing my improved valve. Fig. 2 is a section taken on line $x$—$x$ in Fig. 1. Fig. 3 is a modified form of valve construction. Fig. 4 is a fragmentary detail view of the walls and pressure plate when this form of valve is used.

Similar reference numerals refer to similar parts throughout the entire description.

As shown in the drawings, 1 indicates the cylinders, having pistons 2 operating therein.

3 is a connecting rod pivotally attached to a piston by means of the piston pin 4, the connecting rod extending to a crank 5. This part of the rod has been omitted, as it "*per se*" forms no part of my present invention, and for the reason that any of the usual devices for this purpose may be used.

On the crank 5 adjacent the arm 6 thereof, I mount a bevel gear 7, which must be of sufficient diameter, so that the arm of the crank will clear the inner edge of the teeth of the said gear. This gear is in mesh with a gear 8, which is fixedly mounted upon a shaft 9, which is suitably secured in a side wall 10 of the crank case, a fragmentary portion of the latter only being shown. The outer end of this shaft 9 has a sprocket 11 mounted thereon, which carries a chain 12, which extends to a sprocket 28, which is mounted on and rigidly secured to the end of the valve shaft 13. This shaft is mounted and rotates in a bearing 14 and extends between the cylinders from one side to the other.

Considerable difficulty has been experienced in the operation of rotary valves due to the inability to cool the valve shaft. I avoid this objection by providing a number of large spaces 16 and 18, which are open to the air and which it will be observed completely separate the shaft bearing from contact with the cylinder walls except at the ends, and these walls are directly in contact with the water in the water jacket, so that they will not be subjected to undue heating.

An annular shoulder 17 is cast or formed on the side walls of the adjacent cylinders, and a port or passage extends from the face of the said lug to the interior of each of the said cylinders. A similar shoulder is formed on the opposite walls of the cylinders and is also provided with ports or passages for the inlet of the explosive charge.

Upon the shaft 13 adjacent the face of the shoulder 17 is mounted my improved valve 19, which is, as clearly seen in the detailed views, a disk, which is formed with a boss or hub 30, at its central portion. As shown, this hub 30, is connected to the main portion of the disk by a beveled wall 31, and inasmuch as the bevel extends away from the pressure plate 20, it will be apparent that an annular space 32 is left intermediate the external wall of the disk valve and the internal wall of the pressure plate 20, and in addition to helping to cool the valve, this construction strengthens the disk by stiffening it very materially. As shown in Fig. 3, I have provided an additional raised portion 33 formed on the opposite side of the valve, which is also connected by means of a beveled wall to the main portion of the disk itself. This construction increases the size of the air space which surrounds the shaft 13, and as shown in Fig. 4, the pressure plate 20 has to be provided with an annular recess to accommodate the portion 33 when this form is used. The valve is provided with an opening 29, which is adapted to register with the ports or passages extending from the face of the shoulder to the interior of the cylinder.

It will be obvious to persons skilled in the art that the shape of the openings may be varied to suit conditions, as to whether one desired to accomplish extra quick opening or closing or other variations without deviating from the scope of my invention.

Outside of each of the valve 19, I place a pressure plate 20, which is secured to the shoulder 17 by bolts 21 or in any other convenient manner. The pressure plates 20 are provided with bearings for the valve shaft 13, and are provided with openings 22 and 23, which correspond to the ports or passages extending to the interior of the cylinders. A similar form of construction is utilized for the other side of the cylinder except when the area of the ports vary.

For the purpose of illustration, I have shown a concrete form for rotating the valve shaft 13, and in turn the valves proper, but I do not wish to be understood as limiting myself to the precise form shown, as many mechanical devices may be used to accomplish the result. For example, a shaft and beveled gears or a train of gears might be employed, and in fact a number of devices, all of which would be capable of effecting rotation of the valve in the desired direction.

The operation of the device is as follows: The rotation of the crank 5 carries with it, the bevel gear 7, and it, in turn, causes the bevel gear 8 to rotate, thus causing the rotation of the shaft 9, which carries with it, the sprocket 11, and thus through the medium of the chain 12, the valve shaft 13 is rotated. The rotation of this shaft brings the opening in the inlet valve in register with the port or passage, leading the incoming charge to the interior of the cylinders, the opening in the exhaust valve being so located with reference to the opening in the inlet valve so as to cause it to come into register with the exhaust port or passage at the proper time to permit the discharge of the products of combustion.

Having described my invention, what I regard as new and desire to secure by Letters Patent, is:

1. The combination with a gas engine, provided with ports of a shoulder on adjacent cylinders, of a disk valve, a rotating shaft on which said disk is mounted, a hub in the center of said disk, which is connected to the disk by a beveled wall, a pressure plate to hold said valve to its seat, there being an annular chamber surrounding the shaft and intermediate the beveled wall of the valve and the inner surface of the pressure plate, there being openings in said valve corresponding to the ports of the engine.

2. The combination with a gas engine provided with ports of a shoulder on adjacent cylinders, of a disk valve, a rotatable shaft on which said disk is mounted, a hub in each side of the said disk which is connected to the disk by beveled walls, a chamber therebetween forming an annular space which surrounds the said shaft, there being openings in the said disk corresponding with the ports of the engine.

In witness whereof I have signed the foregoing specification.

RICHARD SCHMITZ.

Witnesses:
K. DOLBEY,
C. M. BAUMEISTER.